United States Patent
Lee et al.

(10) Patent No.: US 9,371,011 B2
(45) Date of Patent: Jun. 21, 2016

(54) SEAT CUSHION EXTENSION APPARATUS

(71) Applicants: Hyundai Motor Company, Seoul (KR); Kia Motors Corporation, Seoul (KR); Hyundai Dymos Inc., Seosan-si (KR)

(72) Inventors: Tae Hoon Lee, Seoul (KR); Seok Nam Kang, Seoul (KR); Dong Woo Jeong, Seongnam-si (KR); Sang Do Park, Suwon-si (KR); Eom Seok Yoo, Hwaseong-si (KR); Yong Hee Shin, Seoul (KR)

(73) Assignees: Hyundai Motor Company, Seoul (KR); Kia Motors Corporation, Seoul (KR); Hyundai Dymos Inc., Seosan-si (KR)

( * ) Notice: Subject to any disclaimer, the term of this patent is extended or adjusted under 35 U.S.C. 154(b) by 0 days.

(21) Appl. No.: 14/571,076

(22) Filed: Dec. 15, 2014

(65) Prior Publication Data
US 2015/0258914 A1 Sep. 17, 2015

(30) Foreign Application Priority Data
Mar. 13, 2014 (KR) ........................ 10-2014-0029329

(51) Int. Cl.
*B60N 2/02* (2006.01)
*B60N 2/62* (2006.01)

(52) U.S. Cl.
CPC ................ *B60N 2/0284* (2013.01); *B60N 2/62* (2013.01); *B60N 2002/0236* (2013.01)

(58) Field of Classification Search
CPC ....... B60N 2/0284; B60N 2/0232; B60N 2/62
USPC .................................................. 297/284.11
See application file for complete search history.

(56) References Cited

U.S. PATENT DOCUMENTS

| | | | | |
|---|---|---|---|---|
| 4,944,554 A * | 7/1990 | Gross | ..................... | A47C 7/462 297/284.11 |
| 5,171,062 A * | 12/1992 | Courtois | .................. | B60N 2/62 297/284.11 |
| 7,104,609 B2 * | 9/2006 | Kim | ......................... | A47C 1/03 297/284.11 X |
| 7,614,693 B2 * | 11/2009 | Ito | ........................ | B60N 2/0284 297/284.11 |
| 8,016,355 B2 * | 9/2011 | Ito | ........................ | B60N 2/0284 297/284.11 |

(Continued)

FOREIGN PATENT DOCUMENTS

| | | | |
|---|---|---|---|
| JP | 6-284940 A | 10/1994 | |
| JP | 2007-118706 A | 5/2007 | |

(Continued)

*Primary Examiner* — Rodney B White
(74) *Attorney, Agent, or Firm* — Morgan, Lewis & Bockius LLP

(57) ABSTRACT

A seat cushion extension apparatus includes an extension motor supported on a cushion frame, an extension mounting bracket holding an extension cushion such that the extension cushion is displaceable forward and backward on a seat cushion, and a power transmission unit connecting between the extension motor and the extension mounting bracket. The power transmission unit receives power from the extension motor and moves the extension mounting bracket forward and backward. A slide device is coupled with the extension mounting bracket, and supports the extension mounting bracket such that the extension mounting bracket is slidable forward and backward in the cushion frame. The front-back length of the seat cushion can be freely extended, and limitations in the thickness of a cushion pad or the like are removed.

7 Claims, 8 Drawing Sheets

(56) References Cited

U.S. PATENT DOCUMENTS

| | | | | |
|---|---|---|---|---|
| 8,167,370 B2* | 5/2012 | Arakawa | ............... | B60N 2/0232 |
| | | | | 297/284.11 |
| 8,888,181 B2* | 11/2014 | Perraut | .................... | B60N 2/23 |
| | | | | 297/284.11 |
| 2001/0004164 A1* | 6/2001 | Mattsson | ............. | B60N 2/0284 |
| | | | | 297/284.11 |
| 2007/0102985 A1* | 5/2007 | Taniguchi | ............ | B60N 2/0284 |
| | | | | 297/284.11 |
| 2008/0157577 A1* | 7/2008 | Lindsay | ............... | B60N 2/0224 |
| | | | | 297/284.11 |
| 2009/0200848 A1* | 8/2009 | Kubler | ................. | B60N 2/0232 |
| | | | | 297/284.11 |
| 2011/0254335 A1* | 10/2011 | Pradier | ................ | B60N 2/0232 |
| | | | | 297/284.11 |
| 2014/0203617 A1* | 7/2014 | Line | ..................... | B60N 2/0284 |
| | | | | 297/423.29 |
| 2014/0292051 A1* | 10/2014 | Planson | ............... | B60N 2/0284 |
| | | | | 297/337 |

FOREIGN PATENT DOCUMENTS

| | | |
|---|---|---|
| KR | 10-0808792 B1 | 3/2008 |
| KR | 10-2010-0033580 A | 3/2010 |
| KR | 10-2012-0136556 A | 12/2012 |
| KR | 10-1219742 B1 | 1/2013 |

* cited by examiner

SEAT CUSHION EXTENSION APPARATUS

CROSS-REFERENCE TO RELATED APPLICATION

This application claims under 35 U.S.C. §119(a) the benefit of Korean Patent Application No. 10-2014-0029329 filed on Mar. 13, 2014, the entire contents of which are incorporated herein by reference.

BACKGROUND (a) Field of the Invention

The present invention relates to a seat cushion extension apparatus and, more particularly, to a seat cushion extension apparatus in which the front-back length of a seat cushion can be freely extended, and limitations in the thickness of a cushion pad or the like are removed.

(b) Description of the Related Art

In general, a seat provided in a vehicle includes a seat cushion which supports the buttocks of an occupant seated thereon so that the occupant feels comfortable, a seatback which supports the back of the occupant, and a headrest which supports the head and neck of the occupant.

In such a conventional vehicle seat, the seat cushion has a preset size, which is not adjustable. Therefore, the seat cushion is somewhat inadequate to provide optimum comfort to occupants having a variety of physical sizes.

For example, when the occupant has long legs, the conventional seat cushion fails to sufficiently support the thighs of the occupant. This may be inconvenient to the occupant, and the occupant may complain about this.

Therefore, a seat cushion extension apparatus was proposed in order to satisfy this need. The seat cushion extension apparatus has an operation mechanism which pushes a part of the seat cushion so that the part of the seat cushion protrudes forward.

An example of such a seat cushion extension apparatus was disclosed in Korean Laid-Open Patent Publication No. 10-2011-0031782 (Mar. 29, 2011). FIGS. 1 to 3 illustrate the configuration and operation of the seat cushion extension apparatus disclosed in this related art document.

Referring to FIGS. 1 to 3 (RELATED ART), reference numeral 1 indicates a cushion frame that forms the framework of a seat cushion, and reference numeral 30 indicates an extension plate. When an extension motor (not shown) operates, the extension plate 30 protrudes and deploys from the cushion frame 1 while rotating upwards.

The extension plate 30 is connected to a gear unit 20 which converts the rotational force of the extension motor into a linear motion force, and cooperates with the operation of the gear unit 20. The extension plate 30 is supported by a support rod 31 on the cushion frame 1 such that it can produce a sufficient amount of supporting force when a body part (e.g. thighs) of the occupant is placed thereon.

Opposite ends of the support rod 31 are coupled with rotary links 32, which are rotatably coupled with front portions of the cushion frame 1.

In addition, the support rod 31 is coupled with the extension plate 30 such that it can support the entire extension plate 30 along the lengthwise direction.

Furthermore, the gear unit 20 includes a lead screw 23, the front end of which is hinge-coupled with the extension plate 30, and gears (not shown) which convert the rotational force of the extension motor into the linear motion force to linearly displace the lead screw 23 forward and backward.

In FIGS. 1 to 3, reference numeral 24 indicates a gear box which is fixed to the bottom surface of the cushion frame 1 via a mounting bracket 24a, and through which the lead screw 23 extends. The gears which convert the rotational force of the extension motor into the linear motion force of the lead screw 23 are disposed inside the gear box 24.

FIG. 2 shows a position in which the lead screw 23 has moved to the rearmost position. In this position, the extension plate 30 coupled with the lead screw 23 is lowered to a position close to the cushion frame 1.

In this state, when the occupant operates the extension motor by manipulating a switch, the driving force of the extension motor moves the lead screw 23 forward. Consequently, the extension plate 30 coupled with the lead screw 23 rises while rotating, and protrudes and deploys forward of the cushion frame 10, as shown in FIG. 3.

At this time, since the rotary links 32 coupled with the extension plate 30 via the support rod 31 rotate on the cushion frame 1, the extension plate 30 can smoothly rotate and rise.

As described above, the seat cushion extension apparatus is the apparatus which allows the occupant to extend the front part of the seat cushion depending on his/her physical attributes such that the seat cushion can sufficiently support his/her thighs. In the related art, the seat cushion extension apparatus has an operation mechanism that concurrently rotates and raises the extension plate in order to support the thighs.

However, in the conventional seat cushion extension apparatus, the hinge point of the rotary link serving as the center of rotation of the extension plate is positioned above the cushion frame. Consequently, the extension plate deploys about the hinge point that is positioned above, thereby limiting the thickness of the cushion pad which is designed to provide convenience and comfort when the occupant is seated on the seat cushion.

In addition, the extension plate is configured such that it deploys while rotating upwards, thereby limiting the front-back length of the seat cushion part that can be extended.

The information disclosed in the Background of the Invention section is only for the enhancement of understanding of the background of the invention, and should not be taken as an acknowledgment or any form of suggestion that this information forms a prior art that would already be known to a person skilled in the art.

SUMMARY

Accordingly, the present invention provides an improved seat cushion extension apparatus which has an operation mechanism which moves an extension plate to slide forward and backward such that the front-back length of a seat cushion can be freely increased, and limitations in the thickness of a cushion pad or the like can be removed.

In order to achieve the above object, according to one aspect of the present invention, there is provided a seat cushion extension apparatus that includes: an extension motor supported on a cushion frame; an extension mounting bracket holding an extension cushion such that the extension cushion is displaceable forward and backward on a seat cushion; and a power transmission unit connecting between the extension motor and the extension mounting bracket. The power transmission unit receives power from the extension motor and moves the extension mounting bracket forward and backward. The seat cushion extension apparatus also includes a slide device coupled with the extension mounting bracket. The slide device supports the extension mounting bracket such that the extension mounting bracket is slidable forward and backward in the cushion frame.

According to an embodiment of the present invention, the power transmission unit may include a lead screw coupled with the extension mounting bracket. The lead screw moves forward and backward to displace the extension mounting bracket. The power transmission unit also includes a gear unit which converts a rotational force of the extension motor into a force that moves the lead screw forward and backward.

A driving shaft of the extension motor may be coupled with and supported by the gear unit. A hinge bracket may be disposed on the gear unit, and may be hinge-coupled with a motor mounting bracket fixed to the cushion frame. A front end of the lead screw may be coupled with the gear unit, and may be hinge-coupled with the extension mounting bracket.

The slide device may include a pair of right and left slide devices disposed on the cushion frame. The right and left ends of the extension mounting bracket may be coupled with and supported by the slide devices.

Each of the slide devices may include a guide rail fixed to the cushion frame and a slide member coupled with the guide rail such that the slide member is slidable forward and backward. The slide member is fixedly coupled with a corresponding end of the extension mounting bracket.

In the seat cushion extension apparatus according to the present invention as set forth above, since the extension mounting bracket and the extension cushion can only slide forward and backward without rotating, it is advantageous in that the length of the seat cushion part can freely be extended and the extension of the length of the seat cushion part can be increased to be greater than that of a rotation-type seat cushion extension apparatus.

In addition, the extension cushion can be configured in a variety of shapes without limitations in the thickness of the cushion pad or the like. Both ends of the extension mounting bracket are supported by the lead screw while being firmly supported by the slide devices. It is possible to obtain a sufficient amount of supporting force and distribute load. Accordingly, a reliable operation can be enabled by a simple configuration.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to exemplary embodiments of the present invention, examples of which are illustrated in the accompanying drawings, so that a person skilled in the art to which the present invention relates can easily put the present invention into practice.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention provides an improved seat cushion extension apparatus that allows the front-back length of a seat cushion to be freely increased and removes limitations in the thickness of a cushion pad or the like.

For this purpose, the seat cushion extension apparatus according to the present invention includes an operation mechanism that causes an extension mounting bracket to slide forward and backward.

Figure 1:
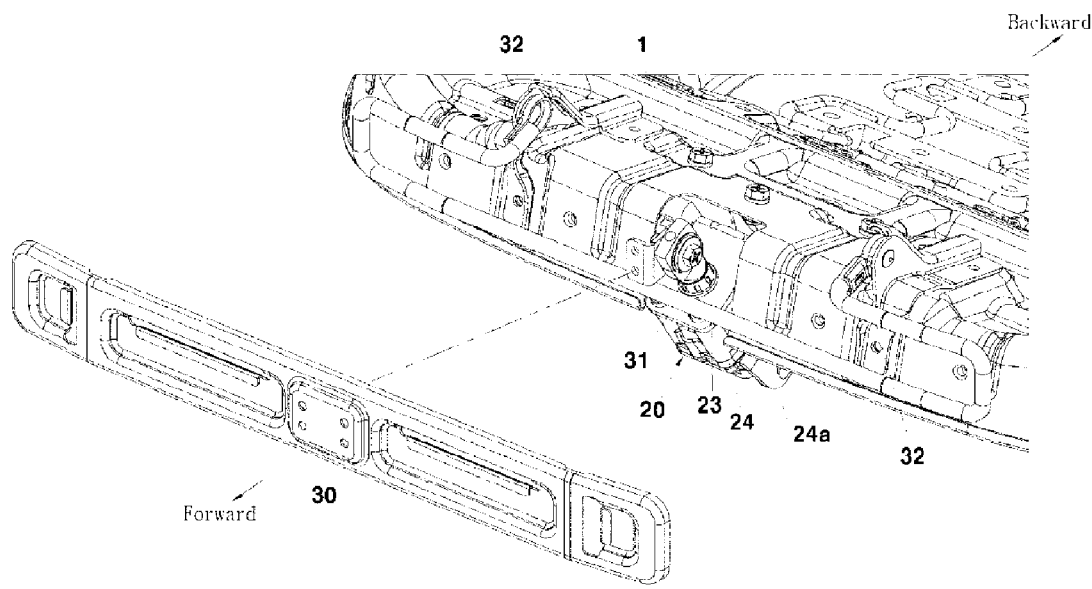
FIGS. 1 to 3 (RELATED ART) are views illustrating the configuration and operation of a conventional seat cushion extension apparatus.
Figure 2:
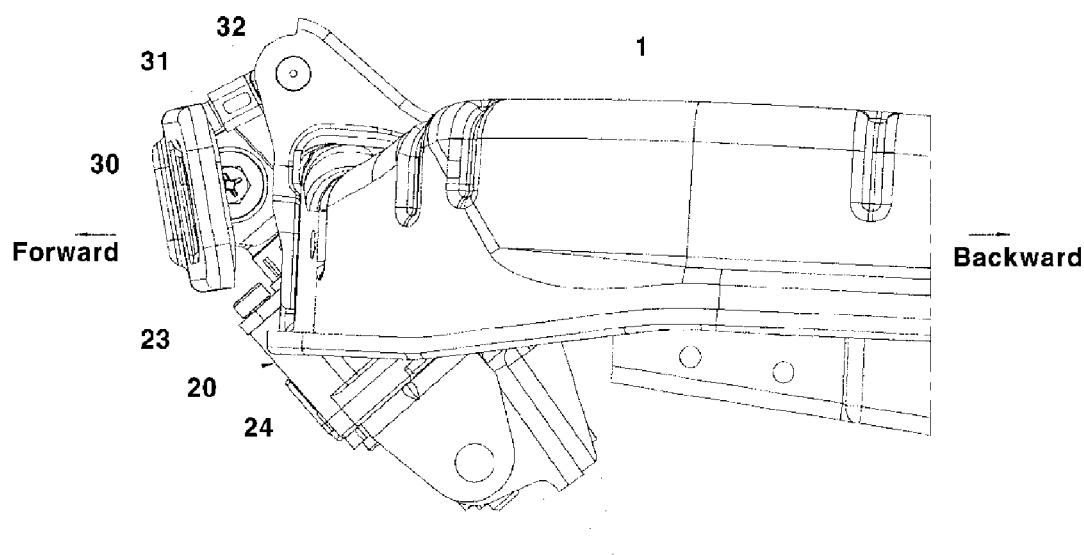
Figure 3:
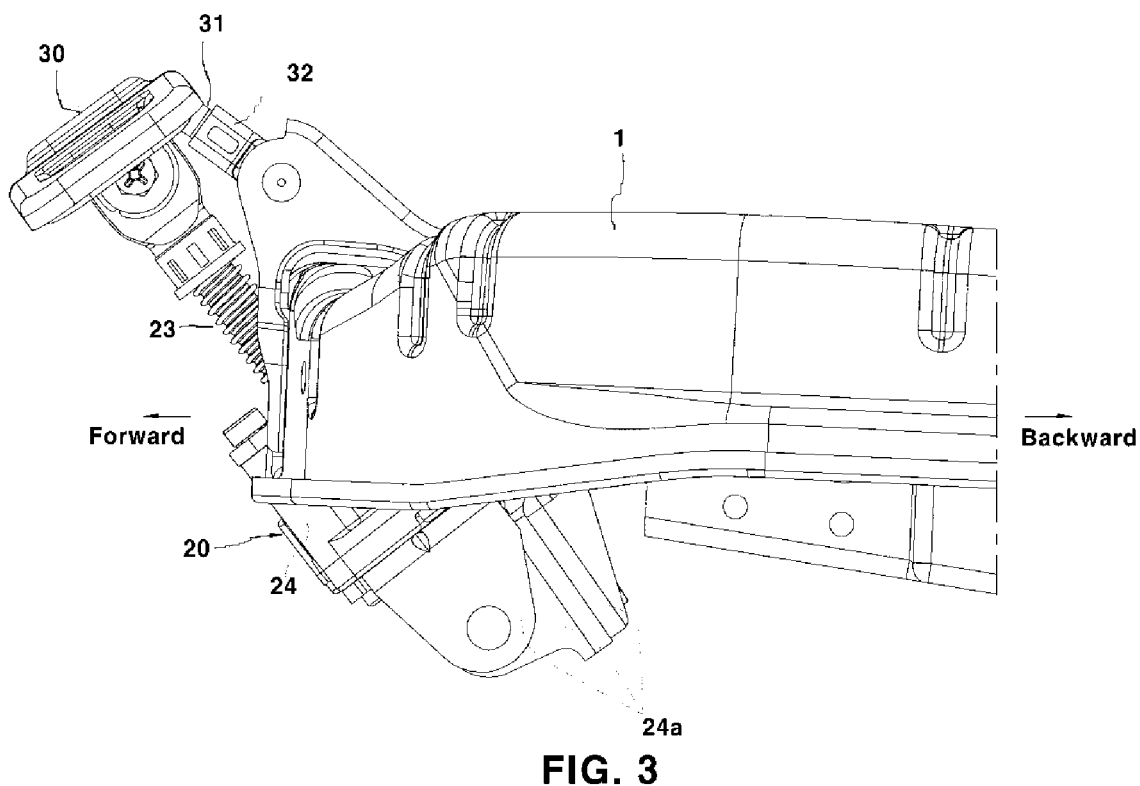
Figure 4A:
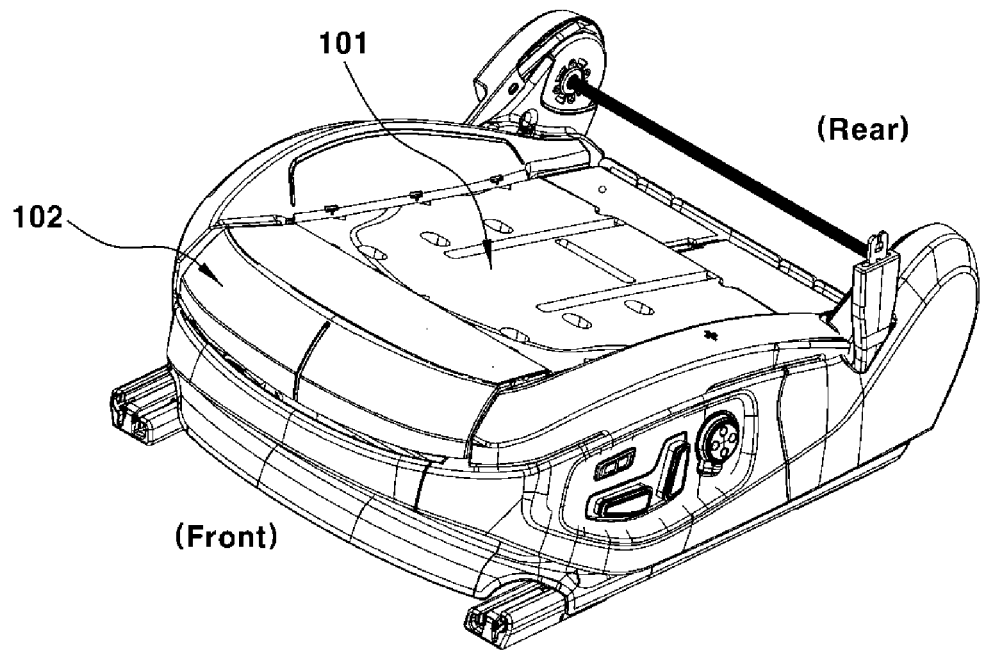
FIGS. 4A and 4B are views illustrating a vehicle seat to which a seat cushion extension apparatus according to an exemplary embodiment of the present invention is applied.
Figure 4B:
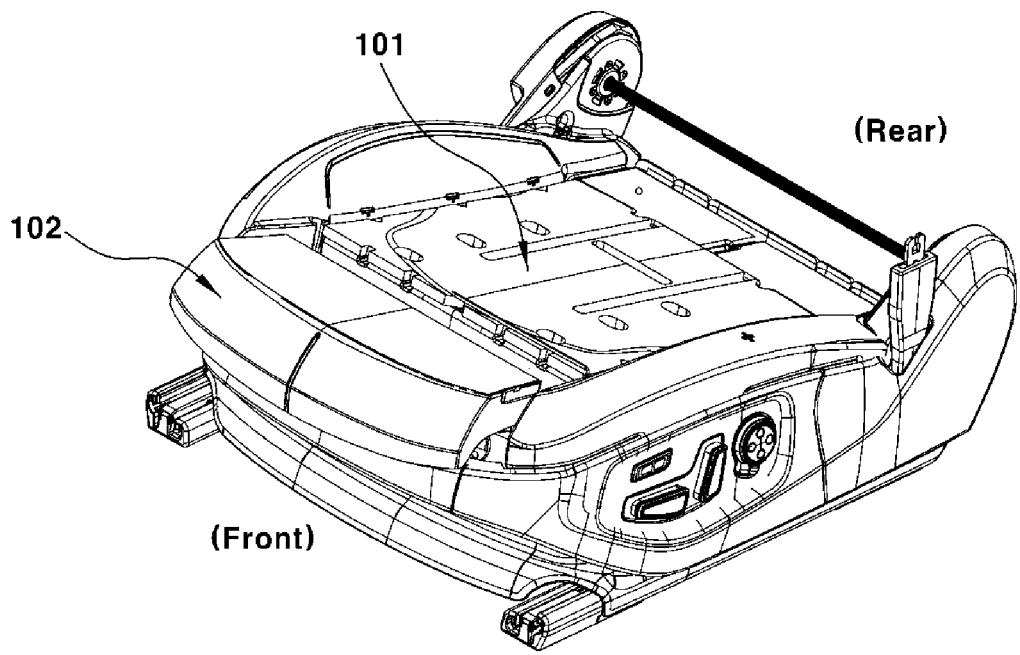

FIGS. 4A and 4B are views illustrating a vehicle seat to which a seat cushion extension apparatus according to an exemplary embodiment of the present invention is applied. The vehicle seat includes a seat cushion 101 which supports the buttocks of an occupant and an extension cushion 102 which is disposed separately in front of the seat cushion 101, the extension cushion 102 being movable forward and backward.

The extension cushion 102 supports the bottoms of the thighs of the occupant who is in the seat. The extension cushion 102 is displaced forward and backward in front of the seat cushion 101 in response to the operation of the extension motor in the state in which the extension cushion 102 is mounted on the extension mounting bracket which will be described later.

In addition, the forward and backward positions of the extension cushion 102 can be adjusted by the direction and amount by which the extension motor is driven. In response to the adjustment of the forward and backward positions of the extension cushion 102, the extension of the length of the cushion part of the seat can be variably adjusted.

A user can properly adjust the forward and backward positions of the extension cushion 102 as above depending on his/her physical size by manipulating a switch. As shown in FIG. 4B, when the extension seat cushion 102 is displaced forward from the seat cushion 101 which is positioned at the rear of the extension seat cushion 102, the entire length of the cushion part including the extension cushion 102 is increased.

Figure 5:
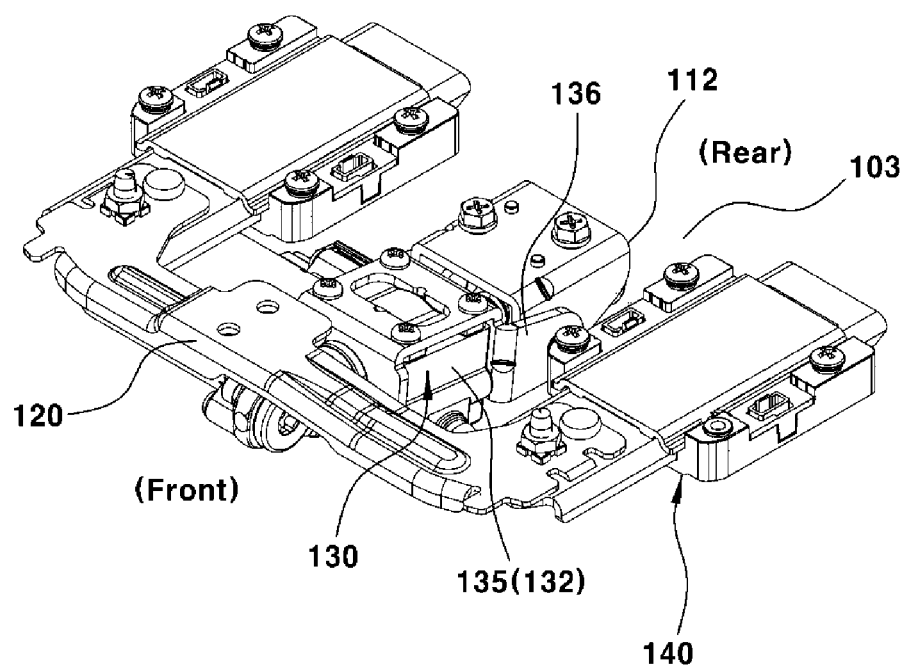
FIG. 5 is an assembled perspective view showing the main configuration of the vehicle seat to which the seat cushion extension apparatus according to the exemplary embodiment of the present invention is applied.
Figure 6:
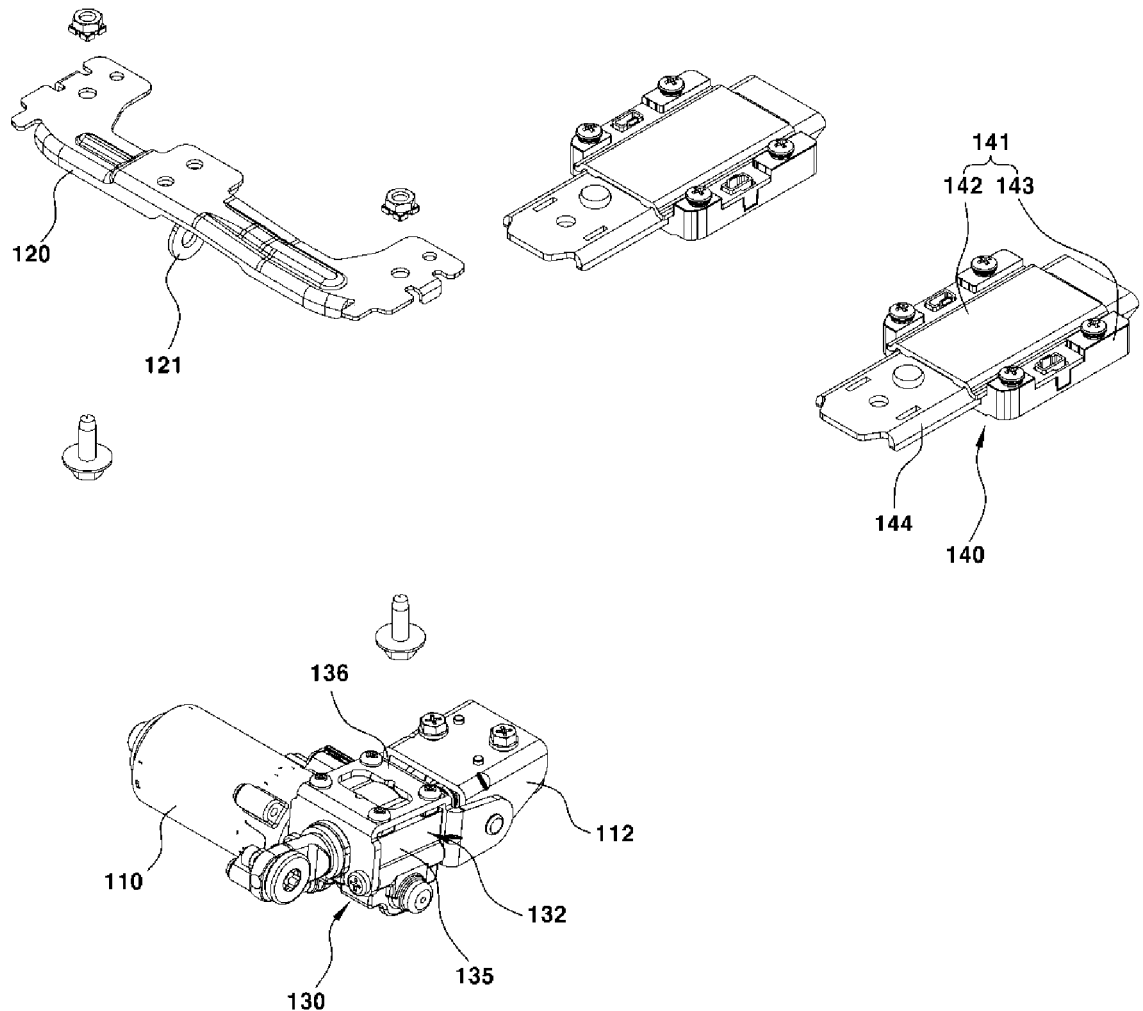
FIG. 6 is a disassembled perspective view showing the main configuration of the vehicle seat to which the seat cushion extension apparatus according to the exemplary embodiment of the present invention is applied.

FIG. 5 is an assembled perspective view showing the main configuration of the vehicle seat to which the seat cushion extension apparatus according to an exemplary embodiment of the present invention is applied, and FIG. 6 is a disassembled perspective view showing the main configuration of the vehicle seat to which the seat cushion extension apparatus according to an exemplary embodiment of the present invention is applied.

Figure 7A:
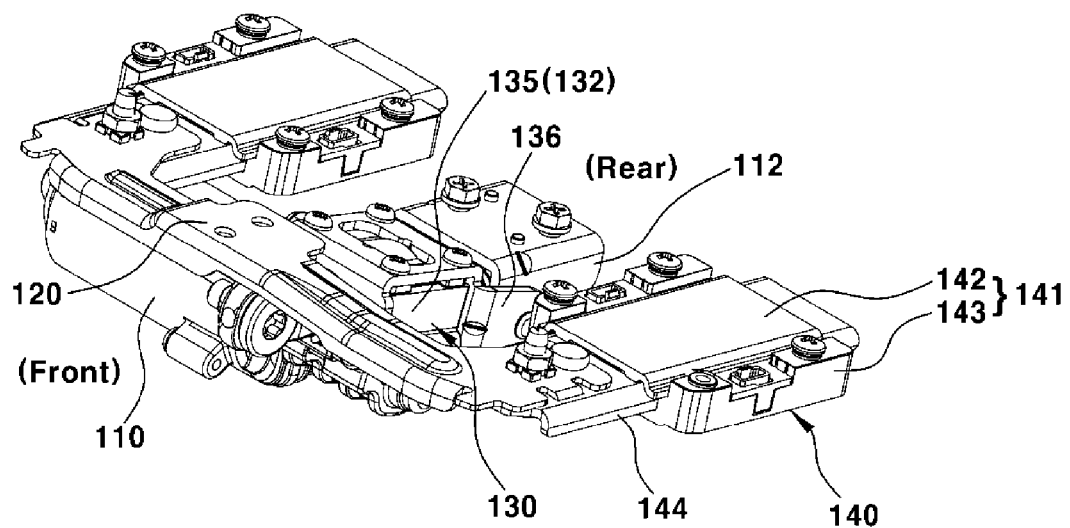
FIGS. 7A, 7B, 8A and 8B are views showing the operation states of the vehicle seat to which the seat cushion extension apparatus according to the exemplary embodiment of the present invention is applied.
Figure 7B:
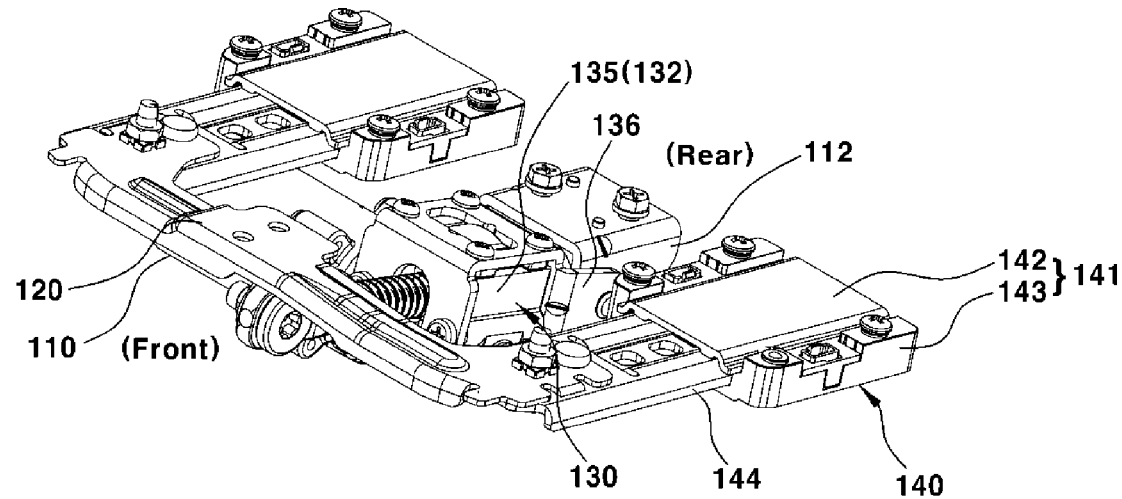
Figure 8A:
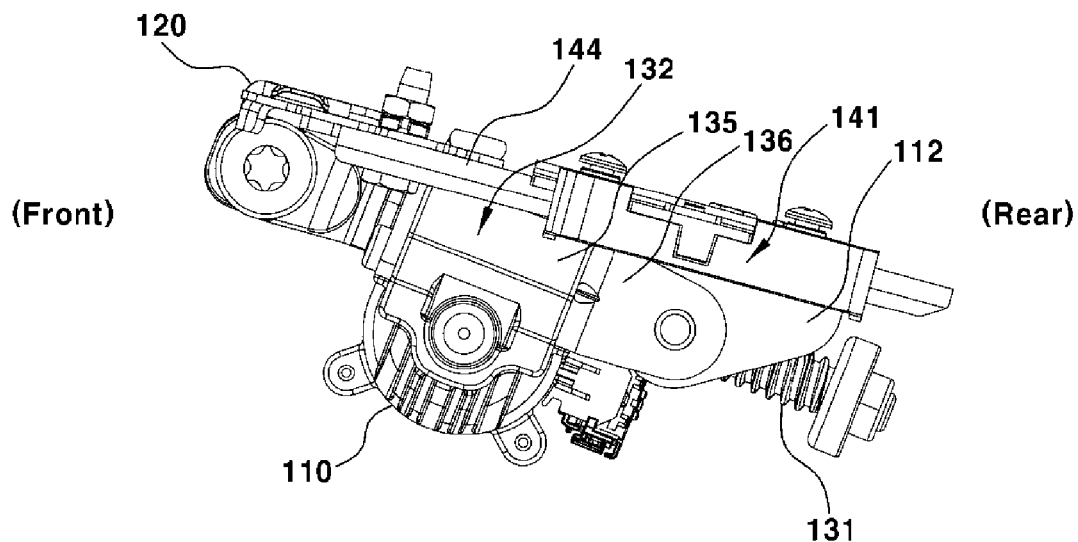
Figure 8B:
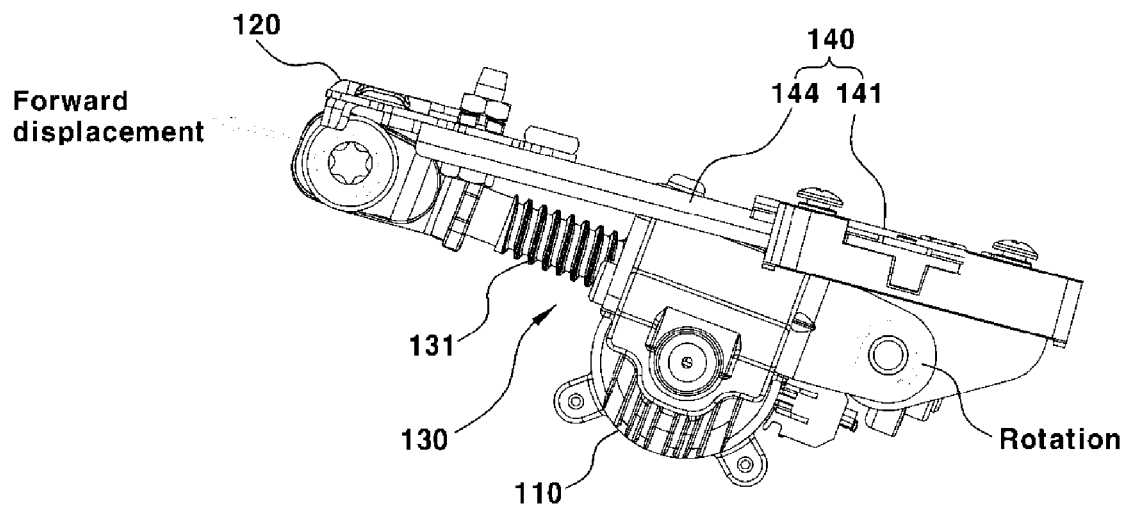

FIGS. 7A, 7B, 8A and 8B are views showing the operation states of the vehicle seat to which the seat cushion extension apparatus according to an exemplary embodiment of the present invention is applied, in which FIGS. 7A and 8A show the initial state in which the extension mounting bracket 120 is positioned at the rear, and FIGS. 7B and 8B show the state in which the extension mounting bracket 120 has been displaced forward.

The state of FIGS. 7A and 8A corresponds to the state of the seat in FIG. 4A, and the state of FIGS. 7B and 8B corresponds to the state of the seat shown in FIG. 4B.

Figure 9:
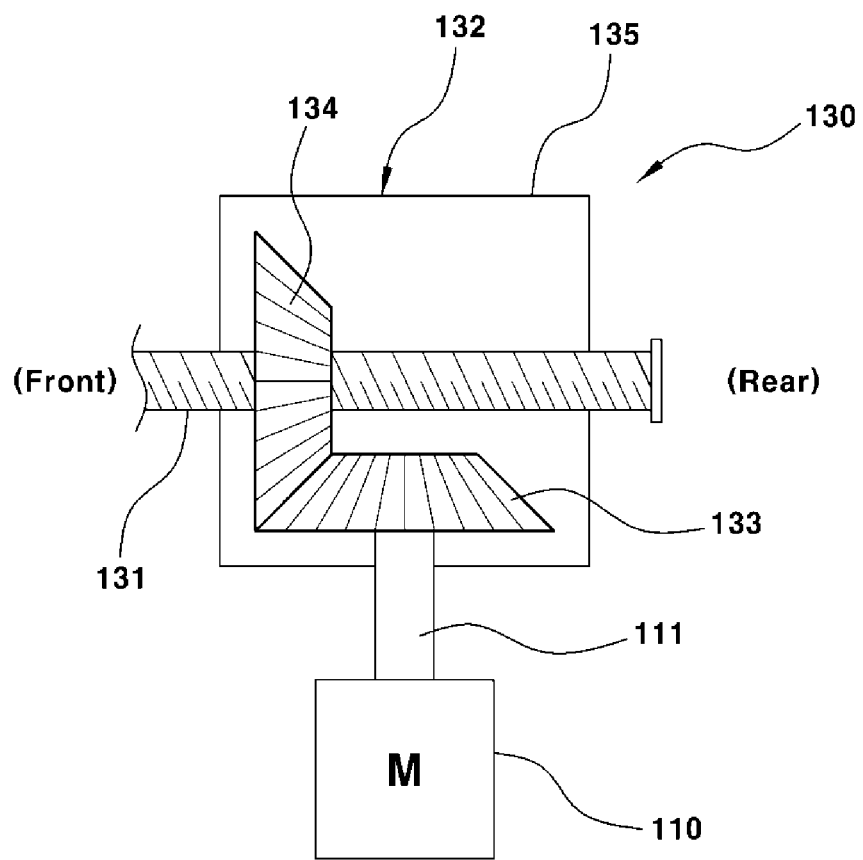
FIG. 9 is a schematic view showing the main configuration of a power transmission unit in the seat cushion extension apparatus according to the exemplary embodiment of the present invention.

FIG. 9 is a schematic view showing the main configuration of a power transmission unit 130 in the seat cushion extension apparatus according to an exemplary embodiment of the present invention.

A description will be given of the configuration of the seat cushion extension apparatus according to an exemplary embodiment of the present invention. The seat cushion extension apparatus includes an extension motor 110, the extension cushion (102 in FIGS. 4A and 4B), the power transmission unit 130 and slide devices 140. The extension motor 110 is supported on a cushion frame (not shown) which forms the framework of the seat cushion (101 in FIGS. 4A and 4B), and operates on power supplied in response to a switch (not shown) manipulated by a user. The extension cushion (102 in FIGS. 4A and 4B) is mounted on the extension mounting bracket 120. The power transmission unit 130 is disposed between the extension motor 110 and the extension mounting bracket 120, and displaces the extension mounting bracket 120 forward and backward on the power transmitted from the extension motor 110. The slide devices 140 are coupled with the extension mounting bracket 120, and support the extension mounting bracket 120 in the cushion frame such that the extension mounting bracket 120 can slide forward and backward.

In this configuration, the extension motor 110 is coupled with the cushion frame via the motor mounting bracket 112 which is fixed to the bottom of the cushion frame. More specifically, the extension motor 110 can be coupled with the motor mounting bracket 112 via a gear unit 132 which converts the power (rotational force) of the extension motor 110 into a linear motion force with which a lead screw 131 is displaced forward and backward.

For example, in the state in which a drive shaft (111 in FIG. 9) of the extension motor 110 is coupled with the gear unit 132, a hinge bracket 136 is fixed integrally to a gear box 135 of the gear unit 132, and the hinge bracket 136 is hinge-coupled with the motor mounting bracket 112.

Thus, the extension motor 110 is coupled with and supported by the cushion frame via the gear box 135 of the gear unit 132, the hinge bracket 136 and the motor mounting bracket 112. In particular, the extension motor 110 is configured such that it can rotate upwards and downwards about a point where the hinge bracket 136 and the motor mounting bracket 112 are hinge-coupled with each other (see FIGS. 8A and 8B).

Although the motor mounting bracket 112 can be directly coupled with the cushion frame, the motor mounting bracket 112 is preferably coupled with a connecting bracket 103 which is separately fixed to the bottom of the cushion frame.

The power transmission unit 130 includes the lead screw 131 and the gear unit 132. The lead screw 131 is coupled with the extension mounting bracket 120, and linearly moves forward and backward in the axial direction to displace the extension mounting bracket 120 forward and backward. The gear unit 132 converts the rotational force of the extension motor 110 into the linear motion force of the lead screw 131.

The gear unit 132 has the gear box 135 in which gears which convert the rotational force inputted through a driving shaft 111 of the extension motor 110 into the linear motion force of the lead screw 131 are disposed. FIG. 9 shows an example of the gear unit 132.

As shown in FIG. 9, the gear unit 132 includes a first gear 133 which is rotatable and is coupled with the driving shaft 111 of the extension motor 110, a second gear 134 which is rotatable and is meshed with the first gear 133 such that it can change the direction of the rotational force of the driving shaft 111, and the gear box 135 which is coupled with and supported by the bottom of the cushion frame via the hinge bracket 136 and the motor mounting bracket 112 while surrounding the first gear 133 and the second gear 134. The lead screw 131 extends through and is coupled with the gear box 135.

The lead screw 131 is meshed with the second gear 134 while extending through the gear box 135 and the second gear 134. When the second gear 134 is rotating, the lead screw 131 linearly moves forward and backward in the axial direction with respect to the gear unit 132 including the gear box 135 depending on the direction and amount by which the second gear 134 rotates.

As shown in FIG. 9, the extension motor 110 can be arranged substantially at the right angle from the lead screw 131 in which the driving shaft 111 having the first gear 133 being disposed thereon is linearly arranged in the front-back direction on the cushion frame The lead screw 131 is linearly arranged in the front-back direction below the cushion frame. When the lead screw 131 moves in the axial direction, the lead screw 131 displaces the extension mounting bracket 120 by pushing or drawing the extension mounting bracket 120. For this purpose, the front end of the lead screw 131 is hinge-coupled with a screw coupling portion 121 of the extension mounting bracket 120.

The screw coupling portion 121 protrudes downward from the lateral center of the extension mounting bracket 120. At a position below the extension mounting bracket 120, the lead screw 131 connects the screw coupling portion 121 of the extension mounting bracket 120 and the gear unit 132 to each other in the front-back direction.

For example, the driving shaft 111 of the extension motor 110 is coupled with and supported by the gear unit 132. The hinge bracket 136 disposed on the gear unit 132 is hinge-coupled with the motor mounting bracket 112 fixed to the cushion frame. The front end of the lead screw 131 coupled with the gear unit 132 is hinge-coupled with the extension mounting bracket 120.

In addition, the slide devices 140 are components that support the extension mounting bracket 120 such that the extension mounting bracket 120 can slide forward and backward on the cushion frame. The slide devices 140 are provided in a pair of slide devices which are arranged on lower portions of the cushion frame such that the right and left ends of the extension mounting bracket 120 can be coupled with the slide devices 140 (see FIGS. 5 and 6).

Each of the slide devices 140, with which the both ends of the extension mounting bracket 120 are coupled, includes a guide rail 141 which is fixed to the bottom of the cushion frame and a slide member 144 which is coupled with the guide rail 141 such that it can slide forward and backward and to which a corresponding end of the both ends of the extension mounting bracket 120 is fixed.

Although the guide rail 141 can be directly coupled with the cushion frame, the guide rail 141 is preferably coupled with the connecting bracket 103 which is separately fixed to the bottom of the cushion frame.

In addition, the guide rail 141 can be an assembly in which two rail members are coupled into one unitary body. The two rail members include the upper and lower rail members 142 and 143 which are disposed at the upper and lower sides. Here, one rail member of the upper and lower rail members 142 and 143 can be fixed integrally to the cushion frame or the connecting bracket 103.

The slide member 144 is sandwiched and coupled between the upper rail member 142 and the lower rail member 143 of the guide rail 141 such that it can slide forward and backward.

The slide member 144 is the member that is slidably fitted into and coupled with the guide rail 141 such that it can be guided forward and backward by the guide rail 141. Each slide member 144 of the slide devices 140 is coupled integrally with the corresponding end of the extension mounting bracket 120.

A description will be given below of the operating state of the seat cushion extension apparatus according to an exemplary embodiment of the present invention.

FIGS. 7A and 8A show the state in which the lead screw 131 and the extension mounting bracket 120 have moved backward and the front-back length of the cushion part of the seat is not increased.

In this state, the extension cushion 102 which is to be mounted on the extension mounting bracket 120 is positioned at the rear (see FIG. 4A).

When the user operates the extension motor 110 from this state by manipulating the switch, the first and second gears 133 and 134 rotate to move the lead screw 131 forward.

At this time, the lead screw 131 which is moving forward pushes the extension mounting bracket 120 forward, so that the extension mounting bracket 120 slides forward with respect to the cushion frame using the pair of the right and left slide devices 140.

In addition, in each of the slide devices 140, the slide member 144 to which a corresponding end of the extension mounting bracket 120 is fixed slides forward along the guide rail 141.

Consequently, as shown in FIGS. 7B and 8B, as the extension mounting bracket 120 moves and protrudes forward from the cushion frame, the extension cushion 102 mounted on the extension mounting bracket 120 is also displaced forward from the seat cushion 101 and is converted into the deployed position (see FIG. 4B). In response to the extension cushion 102 being displaced and deployed forward, the length of the cushion part of the seat is increased.

In addition, during reverse operation, i.e. when the lead screw 131 moves backward due to the reverse operation of the extension motor 110, the extension bracket 120 is pushed backward by the lead screws 131, and then the extension cushion 102 is also displaced backward to a position close to the seat cushion 101.

In the seat cushion extension apparatus according to the present invention which operates as described above, it is possible to adjust the front-back position of the extension mounting bracket 120 and the extension cushion 102 depending on the direction and amount by which the extension motor 110 and the lead screw 131 are driven.

In addition, the forward and backward movement of the extension mounting bracket 120 and the extension cushion 102 are enabled by the lead screw 131 which linearly moves in the axial direction on the power of the extension motor 110.

Furthermore, the forward and backward movement of the extension mounting bracket 120 and the extension cushion 102 are guided in response to the slide member 144 sliding forward and backward along the guide rail 141. The extension mounting bracket 120 and the extension cushion 102 only move forward and backward without rotating.

Since the front end of the lead screw 131 is hinge-coupled with the extension mounting bracket 120, and the hinge bracket 136, which is integral with the extension motor 110 and the gear box 135, is hinge-coupled with the motor mounting bracket 112, when the extension mounting bracket 120 is displaced forward and backward, the lead screw 131 and the extension motor 110 can rotate about hinge points in relation to the extension mounting bracket 120 and the motor mounting bracket 112 (see FIGS. 8A and 8B).

Consequently, the extension mounting bracket 120 can be smoothly displaced forward and backward.

In addition, in the seat cushion extension apparatus according to the present invention, since the extension mounting bracket 120 is configured such that it can only slide forward and backward without rotation with respect to the cushion frame, the front-back length of the cushion part of the seat can be freely extended. Furthermore, it is possible to increase the extension of the length of the cushion part of the seat to be greater than that of a rotation-type seat cushion extension apparatus.

In addition, the extension cushion 102 can be designed into a variety of shapes without limitations in the thickness of the cushion pad or the like. Since the both ends of the extension mounting bracket 120 are firmly supported by the slide devices 140 and the central portion of the extension mounting bracket 120 is also supported by the lead screw 131, a sufficient amount of supporting force can be obtained and the distribution of load can be enabled. Accordingly, a reliable operation can be enabled by a simple configuration.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A seat cushion extension apparatus, comprising:
an extension motor supported on a cushion frame;
an extension mounting bracket holding an extension cushion such that the extension cushion is displaceable forward and backward on a seat cushion;
a power transmission unit connecting between the extension motor and the extension mounting bracket, wherein the power transmission unit receives power from the extension motor and moves the extension mounting bracket forward and backward; and
a slide device coupled with the extension mounting bracket, wherein the slide device supports the extension mounting bracket such that the extension mounting bracket is slidable forward and backward in the cushion frame,
wherein the power transmission unit comprises:
a lead screw coupled with the extension mounting bracket, wherein the lead screw moves forward and backward to displace the extension mounting bracket; and
a gear unit which converts a rotational force of the extension motor into a force that moves the lead screw forward and backward,
wherein a driving shaft of the extension motor is coupled with and supported by the gear unit,
wherein a hinge bracket is disposed on the gear unit, and is hinge-coupled with a motor mounting bracket fixed to the cushion frame, and
wherein a front end of the lead screw is coupled with the gear unit, and is hinge-coupled with the extension mounting bracket.

2. The seat cushion extension apparatus according to claim 1, wherein a connecting bracket is fixed to the cushion frame, and the motor mounting bracket is coupled with the connecting bracket.

3. The seat cushion extension apparatus according to claim 1, wherein the front end of the lead screw is hinge-coupled with a screw coupling portion of the extension mounting bracket, and the lead screw connects the screw coupling portion and the gear unit in a front-back direction.

4. The seat cushion extension apparatus according to claim 1, wherein the slide device comprises a pair of right and left slide devices disposed on the cushion frame, and wherein right and left ends of the extension mounting bracket are coupled with and supported by the slide devices.

5. The seat cushion extension apparatus according to claim 4, wherein each of the slide devices comprises:
a guide rail fixed to the cushion frame; and
a slide member coupled with the guide rail such that the slide member is slidable forward and backward, the slide member being fixedly coupled with a corresponding end of the extension mounting bracket.

6. The seat cushion extension apparatus according to claim 5, wherein a connecting bracket is fixed to the cushion frame, and the guide rail is coupled with the connecting bracket.

7. The seat cushion extension apparatus according to claim 5, wherein the guide rail is an assembly in which upper and lower rail members are coupled into one unitary body, the upper and lower rail members being disposed at upper and lower sides, wherein one rail member of the upper and lower rail members is fixed to the cushion frame, and wherein the slide member is sandwiched and coupled between the upper rail member and the lower rail member such that the slide member is slidable.

* * * * *